United States Patent [19]
Richter

[11] Patent Number: 5,273,321

[45] Date of Patent: Dec. 28, 1993

[54] FLEXIBLE CONNECTOR WITH INTEGRAL FLEXIBLE EXTENSION CONTROLS

[76] Inventor: James R. Richter, 23024 N. Stonybrook La., Lincolnshire, Ill. 60069

[21] Appl. No.: 888,004

[22] Filed: May 26, 1992

[51] Int. Cl.$^5$ .............................................. F16L 13/04
[52] U.S. Cl. ...................................... 285/92; 285/114; 285/229; 285/286; 285/382
[58] Field of Search ................................ 285/114, 229

[56] References Cited

U.S. PATENT DOCUMENTS

| | | | |
|---|---|---|---|
| 2,565,296 | 8/1951 | Chyle | 285/301 |
| 3,001,801 | 9/1961 | Downing | 285/298 |
| 3,029,094 | 4/1962 | Parlasca et al. | 285/114 |
| 3,084,957 | 4/1963 | Cadwell | 285/299 |
| 3,527,481 | 9/1970 | Lewis | 285/114 |
| 4,204,707 | 5/1980 | Lincicome et al. | 285/114 |
| 4,791,963 | 12/1988 | Gronert et al. | 285/114 X |
| 4,911,206 | 3/1990 | Gropp et al. | 285/114 X |

FOREIGN PATENT DOCUMENTS 6502305  8/1965  Netherlands ............ 285/114

Primary Examiner—Dave W. Arola
Attorney, Agent, or Firm—William E. Dominick

[57] ABSTRACT

A pre-assembled flexible connector for resiliently connecting spaced fluid conduits without making on-site adjustments in the flexible connector. The flexible connector is formed of a flexible body member having at each end an annualar support member in the form of a coupling flange for making a mating engagement with one of the spaced fluid conduits. The coupling flanges have at equally spaced points of attachment adjacent its periphery at least two flexible control elements resistant to elongation which interconnect the coupling flanges and limit the axial extension of the body member. Each of the flexible control elements has its ends fixedly enclosed in an externally threaded sleeve which forms a permanent threaded engagement with an internally threaded passage formed in the coupling flanges at the equally spaced points of attachment in facing surfaces of the coupling flanges without the ends of the sleeves protruding beyond the outer surfaces of the coupling flanges.

1 Claim, 1 Drawing Sheet

U.S. Patent     Dec. 28, 1993     5,273,321
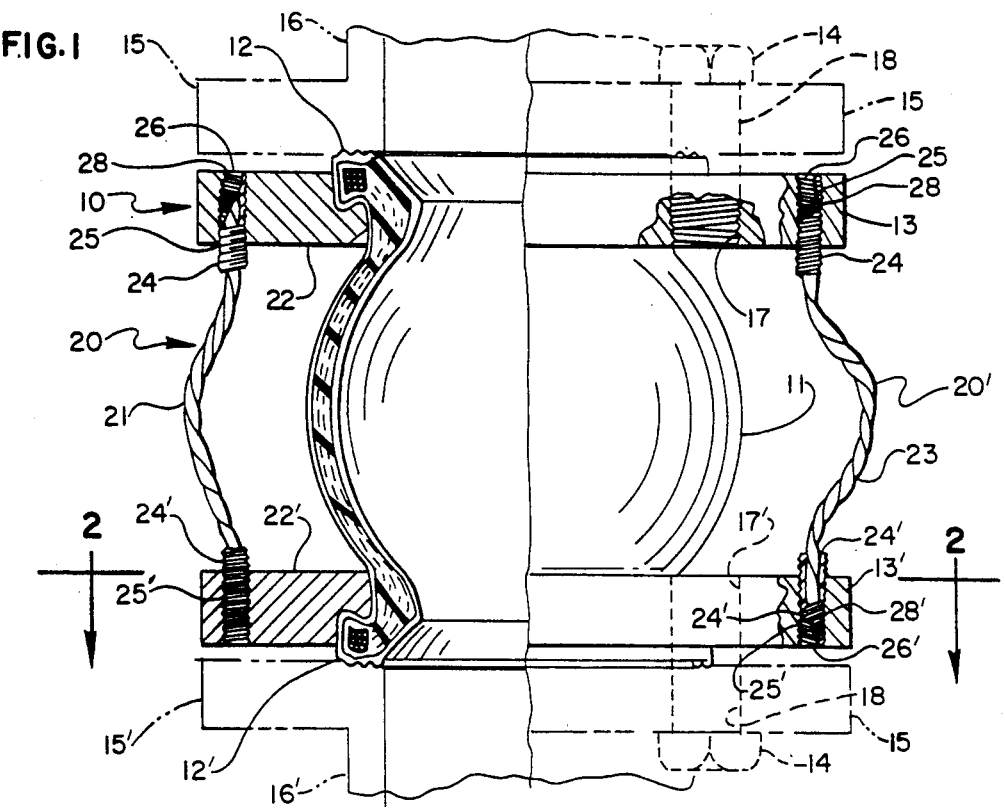
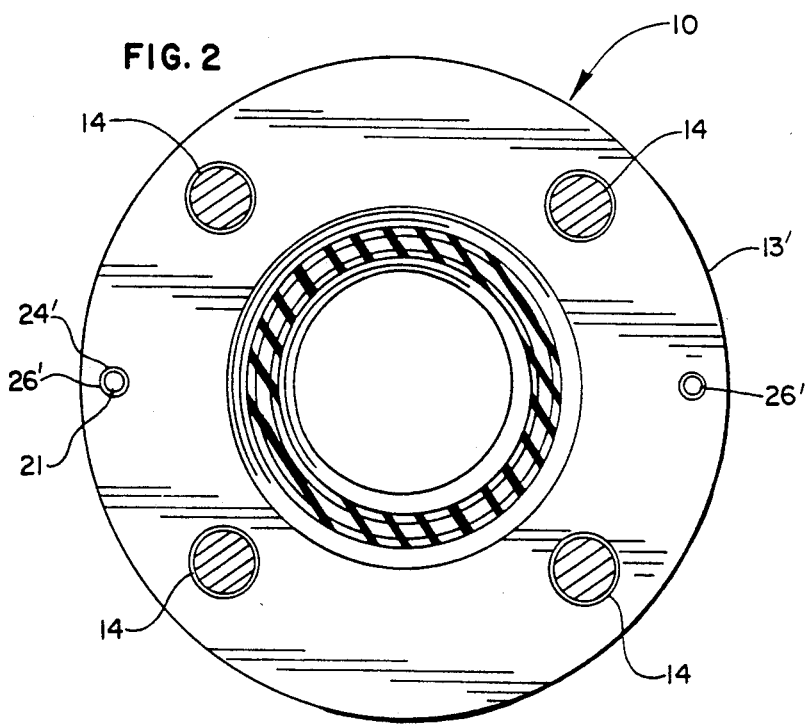
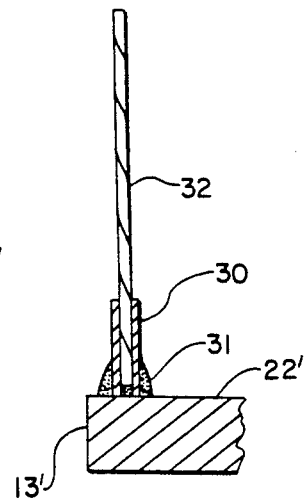

FLEXIBLE CONNECTOR WITH INTEGRAL FLEXIBLE EXTENSION CONTROLS

The present invention relates generally to conduit expansion joints and flexible connectors and more particularly to expansion joints and flexible connectors used in pipe installations which are subjected to pressure thrusts and which are unanchored and/or connected to resiliently mounted equipment causing objectionable noise or vibrations.

Expansion joints and flexible connectors typically have a fluid conducting flexible body member having a coupling flange mounted on the opposite ends thereof for making a fluid tight engagement with pipes or similar conduits. In systems where the flexible connector or expansion joints are subject to pressures causing axial and/or transverse movement, it is necessary to prevent permanently damaging the flexible body member by limiting the axial separation of the coupling flanges supporting the flexible body member.

The present means for restraining the axial extension of expansion joints and flexible connectors involves on-site attachment of gusset plates to the outermost portions of the coupling flanges and connecting two or more control rods or flexible cables to the gusset plates which limit the separation of the coupling flanges within the safe operating range for the particular expansion joint or flexible connector. With the gusset plates extending outwardly from the periphery of the coupling flanges the flexible connectors having the present extension controls require substantially more space than is available in many instances. And, the on-site installation of the gusset plates and control rods or cables involves considerable time and labor and provides an opportunity for making mechanical errors when installing and adjusting the extension controls. Therefore, there is a clear need for a more reliable and cost effective means of controlling the axial extension of flexible connectors and expansion joints.

It is therefore an object of the present invention to provide an expansion joint and flexible connector having extension controls which eliminate the need for on-site installation and the adjustment of the controls.

It is a further object of the present invention to provide a flexible connector and expansion joint having extension controls which occupy less space and reduce interference with adjacent equipment.

It is still further object of the present invention to provide a flexible connector and expansion join having extension controls which provide greater acoustical impedance.

It is also an object of the present invention to provide a flexible connector and expansion joint having extension controls which are more reliable and cost effective.

Other objects of the present invention will be apparent from the detailed description to follow and the accompanying drawing wherein:

FIG. 1 is an elevational view, partially in vertical section and broken away, of a flexible connector embodying the present invention, FIG. 2 is a transverse sectional view taken along the line 2—2 of FIG. 1, and FIG. 3 is a fragmentary sectional view of a modified form of a detail of the structure of FIG. 1.

The improved flexible connectors and expansion joints of the present invention have integral flexible extension controls and are comprised of a fluid conductive flexible body member having an annular metallic support member in the form of a coupling flange mounted on each end of the body member with each of the support member coupling flanges adapted to make a mating engagement with one of two spaced fluid conducting pipes and which has at least two inelastic flexible extension restraint elements interconnecting the coupling flanges by having the opposite ends of each of the restraint elements fixedly attached to one of the coupling flanges at circumferentially equally spaced points on a facing surface of the coupling flanges adjacent the periphery of the restraint elements limit the axial extension of the coupling flanges within the predetermined safe operating range for the flexible connector.

In the embodiment of the invention shown in FIGS. 1 and 2 the flexible connector 10 is comprised of a fluid conductive flexible body member 11 which preferably has a generally spherical shape with integral end flanges 12, 12'. Annular support members in the form of coupling flanges 13, 13' are mounted on the opposite ends of the flexible body member 11 with the body member 11 having integral end flanges 12, 12' preferably extending slightly beyond the outer end of the coupling flanges 13, 13'. The end flanges 12, 12' are adapted to form a sealing engagement with the pipe end flanges 15, 15', respectively. The coupling flanges 13, 13' are provided with a plurality of passages 17, 17' suitable for receiving coupling bolts 14 which extend through passages 18, 18' in the flanges 15, 15' of pipes 16, 16'. The passages 17, 17' and 18, 18' do not have to be threaded, as a bolt and nut can be used in place of the threaded bolts 14. The flexible body member 11 is formed of a natural or synthetic elastomer, such as neoprene and butyl or natural rubber, combined with various reinforcing fabrics, such as bias-ply-tire cord. The particular materials used to form the flexible body member 11 are selected to best meet the requirements of the particular mechanical and/or chemical conditions and the temperature and pressure conditions to which the flexible connector is subjected. The coupling flanges 13, 13' are formed preferably of relatively heavy gauge steel plate suitable for mating engagement with the flanges of the pipes 16, 16' with which the flexible connector is connected.

Flexible extension controls 20, 20' are integrally formed with the flexible connector 10 by permanently connecting the opposite ends of a selected length of flexible cable 21, 23, such as inelastic galvanized aircraft cable, to the facing surfaces 22, 22' of the coupling flanges 13, 13', respectively, and spaced so as not to interfere with the flexible body member 11, the passages 17, 17' in flanges 13, 13' and the coupling bolts 14. In the preferred embodiment shown in FIGS. 1 and 2 each of the flexible cables 21, 23 has fixedly secured to the opposite ends thereof, as by swaging, a metallic sleeve 24, 24'. The outer surface of each of the sleeves 24, 24' is provided with male threads 25, 25', respectively. The threads 25, 25' of sleeves 24, 24', respectively, are adapted to engage with identical female threads 28, 28' formed in the passages 26, 26' of the coupling flanges 13, 13, respectively. The male threads 25, 25' and the female threads 28, 28' are all right handed threads or all left handed threads in order to permit the threaded sleeve to threadably engage in passages 26, 26' from the same direction.

Each of the flexible cables 21, 23 is preferably fixedly secured to the coupling flanges 13, 13' by inserting a threaded sleeve 24 which is fixedly mounted on one end of a said cable 21 into a threaded passage 26 formed in coupling flange 13 and threading the sleeve 24 completely through the passage 26 and into threadable engagement with the threaded passage 26' formed in coupling flange 13'. The combined length of the each extension restraining cable (21 and 23) with sleeves 24, 24' attacher to the opposite ends thereof is such that when the threaded sleeve 24' is fully threadably engaged in the threaded passage 26' in flange 13', the threaded sleeve 24 is fully threadably engaged in the threaded passage 26 in coupling flange 13 and so that the outer ends of the threaded sleeves 24, 24' do not protrude beyond the outer surfaces of the coupling flanges 13, 13'. A drop of thread-lock liquid 29 is preferably placed in the outer end of passages 26, 26' to insure against separation of the threaded engagement between the threads 25, 25' of sleeves 24, 24' and the threaded passages 26, and 26', respectively.

The length, diameter and number of flexible cables required for a particular flexible connector or expansion joint is determined by the size of the connector (i.e. internal diameter), the maximum allowable extension for the elastomer body member and the pressure and temperature to which the connector is subjected under operating conditions. Two (2) flexible extension control cables 6 and ⅜ inches long and ⅜ inches in diametera are provided for a flexible connector having a flexible body member 11 with a two inch internal diameter formed of neoprene and bias-ply-tire cord for use at operating pressures up to 150 psi.

A modified structure for permanently attaching a flexible extension-limiting cable to the coupling flanges 13, 13' is shown in FIG. 3, wherein a metallic element, such as a metallic sleeve 30, is secured to the ends of a selected length of an inelastic flexible cable 32 by swaging and the outer end of the metallic element 30 is permanently secured directly to one of the facing surfaces 22, 22' of the coupling flanges 13, 13' by a weld 31 at equally circumferentially space points adjacent the perimeter of the said flanges.

While the flexible extension restraining elements which interconnect the coupling flanges of the flexible connector preferably are permanently secured to the coupling flanges by a threaded engagement, the ends of the flexible restraining elements can also be fixedly secured to the coupling flanges by swaging the ends of the restraining elements directly to the facing surfaces of the coupling flanges.

The novel flexible connector with integral inelastic flexible expansion controls described herein provides a more reliable flexible connector by eliminating the need for on-cite assembly and adjustment of the extension control elements, thereby significantly reducing the likelihood of improper installation and adjustment of the controls. And, because the flexible connector having the extension controls of the present invention occupies less space than flexible connectors with presently available extension controls, the herein disclosed flexible connectors with integral flexible extension controls can be installed in cramped quarters without interfering with nearby equipment and in locations which would not permit installation of flexible connectors with present extension controls.

I claim:

1. A pre-assembled flexible connector having a flexible body member and integral flexible controls for limiting axial extension of said body member comprising: a fluid conductive flexible body member having annular metallic support members in the form of a coupling flange mounted on each end of said flexible body member, said coupling flanges having facing surfaces which face each other, each said support member coupling flange adapted to make a mating engagement with one of two spaced fluid conducting conduits, at least two flexible extension restraint elements resistant to elongation interconnecting said coupling flanges, each said flexible extension restraint element having each end thereof fixedly enclosed within a metallic sleeve each said metallic sleeve fixedly attached to one of said coupling flanges at circumferentially equally spaced points of attachment on said facing surfaces of said coupling flanges adjacent the periphery thereof, said equally spaced points of attachment each comprising an internally threaded passage in each said flange each said flexible restraint element having a selected length which allows a predetermined safe extension of said body member before said restraint element is placed under tension in response to the predetermined maximum pressure to which said body member is subjected, and each said metallic sleeve fixedly attached to an end of said flexible extension control element is externally threaded and in permanent threaded engagement within of one said internally threaded passage in a said coupling flange without protruding beyond the outer surface of said coupling flange.

* * * * *